May 22, 1962     F. R. BELL     3,035,875
COOLING OF ROTARY COMPONENTS
Filed Feb. 5, 1960
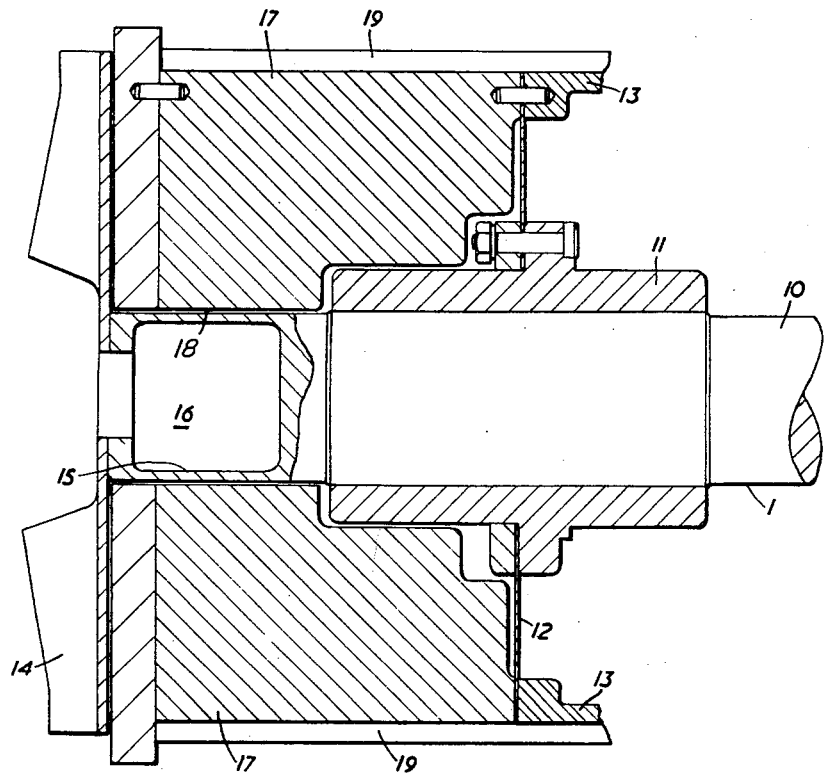
INVENTOR
FRANCIS R. BELL
BY
Holcombe, Wetherill & Brisebois
ATTORNEYS

3,035,875
COOLING OF ROTARY COMPONENTS
Francis Robert Bell, London, England, assignor to The De Havilland Engine Company Limited, Leavesden, England, a company of Great Britain
Filed Feb. 5, 1960, Ser. No. 6,902
Claims priority, application Great Britain Feb. 9, 1959
5 Claims. (Cl. 308—77)

This invention relates to the cooling of rotary components such as rotary shafts, rotors, etc., parts of which are subject to high operating temperatures. The invention is particularly although not exclusively applicable to the cooling of rotor shafts or spindles of fluid-displacement apparatus such as rotary pumps, where the temperature of the fluid being handled exceeds 100° C. and in some instances may be in the region of 700° C.

According to the present invention, in a cooling arrangement for a rotary component which includes a rotary shaft or spindle, a part of the shaft or spindle subject to the conduction of heat along the shaft or spindle is closely embraced by a close-fitting mass of material of high thermal conductivity, for example copper, by which heat which would otherwise be conducted further along the shaft or spindle is withdrawn from the embraced part of the shaft or spindle and is conducted generally radially away from it. By this means excessive conducted heat can be prevented from reaching other parts further along the shaft or spindle which are required to run cool, for example shaft bearings or parts where fine clearances, or conversely interference fits, must be maintained.

The mass of material of high thermal conductivity which embraces the shaft does not necessarily rotate with it, but is formed with a bore whose internal surface closely surrounds but is spaced from the rotating surface of the embraced part of the shaft. Means may be provided for cooling the external parts of the mass of high-thermal-conductivity material to assist the withdrawal of heat by it from the embraced part of the shaft.

According to a further feature of the invention, a part of the shaft or spindle, preferably that selected for embracement by the mass of material of high-thermal-conductivity, is of reduced solid section and contains a cavity which may be filled with a material, for example air or mica, of lower thermal conductivity than that of the shaft material. For example the portion of the shaft selected for embracement may be reduced to a thin annular cross-section, consistent of course with the provision of an adequate margin of strength to permit any necessary torque to be transmitted by the shaft, and the hollow bore of the reduced section may contain the chosen gaseous, liquid or solid material of low thermal conductivity.

The present invention is particularly suitable for use in rotating assemblies such as rotary pump drive shafts which are required to operate elevated temperatures and which employ bearings which are not easily or conveniently cooled by a circulatory lubricating system. As is well known, one of the vulnerable elements of a pump rotor spindle or drive shaft when subjected in service to a temperature rise is the shaft bearing or bearings, and it is an object of the present invention to enable the heating effect to which such bearing or bearings will be subjected in service to be restricted substantially to that due to friction alone.

The invention may be carried into practice in various ways but one specific embodiment will now be described by way of example with reference to the accompanying drawing, which comprises a part-sectional view of a pump shaft provided with cooling means according to the invention.

In the illustrated embodiment the driving shaft 10 of a centrifugal pump is mounted for rotation in a gas-lubricated plain bearing 11 whose outer shell is supported by a non-rigid diaphragm 12 carried by the pump casing 13, only a part of which is visible in the drawing. A rotary impeller 14 is attached to the end of the shaft and is used to pump high-temperature fluid, at a temperature in the region of 350° C. for example, the shaft bearing 11 being close to but spaced from the end of the shaft 10 which carries the impeller 14. The portion 15 of the shaft between the impeller 14 and the shaft bearing 11 is formed with at least one internal cavity 16 which contains air or some other material of low thermal conductivity, for example mica. The wall of the shaft portion 15 surrounding the cavity 16 is of annular section and is as thin as possible consistent that is with design requirements, which may for example involve an adequate maring of strength for transmission of the driving torque, sufficient torsional rigidity, or stiffness in bending, etc. The hollow part 15 of the shaft 10 is embraced externally by a mass 17 of material, for example copper, which is a good heat conductor, this mass being formed with a cylindrical bore 18 spaced from but closely surrounding the external cylindrical surface of the hollow part 15 of the shaft.

Thus the conduction of heat along the shaft 10, from the region of the rotor 14 which is subjected to the high temperature fluid towards the bearing 11, will be restricted by the reduced cross-section of the hollowed-out portion 15 of the shaft, and moreover heat travelling along the shaft through the thin wall of the hollowed-out portion 15 will be withdrawn from the shaft into the mass of surrounding material 17 which by virtue of its high thermal conductivity will have a greater affinity for heat than the solid section of the shaft 10 of lower heat conductivity which is siutated beyond the hollowed-out portion 15 in the direction away from the impeller 14.

The mass of material 17 of high thermal conductivity is enclosed by a thin boundary wall 19, which is preferably contacted on its external surface by a circulating coolant which may be liquid or gaseous to facilitate the extraction of unwanted heat from the shaft. The external surface of the thin boundary wall may be formed with fins to promote cooling in a well-known manner. Alternatively, where an enclosing boundary wall is not employed, the cooling medium may flow over the mass of high thermal conductivity which again may be finned if so required.

The embodiment described and illustrated above is particularly useful and advantageous in an installation in which the shaft and its bearings are so situated that the direct cooling of the bearing and/or of the shaft, for example by an external supply of circulating liquid, is inconvenient. In other words the invention enables the components contained within the external boundary wall of the mass of material to be treated as totally enclosed and sealed off from communication with the exterior of the boundary wall.

What I claim as my invention and desire to secure by Letters Patent is:

1. A rotary component located in a region subject to high operating temperatures and having a rotary shaft extending away from the said region and cooling means for the said shaft, in which the said cooling means comprises a massive stationary block of material of high thermal conductivity closely surrounding a length of the shaft adjacent to the said region, the block having a central bore through which the shaft extends and which fits closely around the shaft, and having an external heat-dissipating surface extending around the bore, and in which the part of the shaft extending through the bore of the block is reduced in cross-section by a cavity filled with a material of lower thermal conductivity than that of the shaft.

2. Apparatus as claimed in claim 1 in which the part of the shaft extending through the bore of the block is of thin annular cross-section surrounding the said cavity and in which the said material of lower thermal conductivity in the cavity is air.

3. Apparatus as claimed in claim 1 in which the axial length of the said portion of the shaft within the bore is at least as great as the shaft diameter, and is less than the axial length of the said external surface of the block.

4. Apparatus as claimed in claim 1 including a supply of coolant fluid and means for circulating the said fluid past and in heat exchange relationship with the said external heat-dissipating surface of the block.

5. Apparatus as claimed in claim 1 having a bearing adjacent to the region subject to high operating temperatures in which bearing the shaft is journalled, and in which the block closely surrounds and encloses an end portion of the bearing adjacent to the said region.

References Cited in the file of this patent
UNITED STATES PATENTS

| | | |
|---|---|---|
| 2,397,012 | Jepson | Mar. 19, 1946 |
| 2,733,106 | Kulling | Jan. 31, 1956 |
| 2,869,939 | Muth et al. | Jan. 20, 1959 |